Feb. 6, 1962 R. T. LYMAN 3,019,965

CHASSIS VENTILATING FANS FOR ELECTRONIC EQUIPMENT

Filed March 31, 1958 2 Sheets-Sheet 1

INVENTOR

Roger T. Lyman

CHASSIS VENTILATING FANS FOR ELECTRONIC EQUIPMENT

Filed March 31, 1958 2 Sheets-Sheet 2

INVENTOR

Roger T. Lyman

United States Patent Office 3,019,965

Patented Feb. 6, 1962

3,019,965

CHASSIS VENTILATING FANS FOR ELECTRONIC EQUIPMENT

Roger T. Lyman, Princeton, N.J., assignor to Kooltronic Fan Company, Princeton, N.J., a corporation of New Jersey Filed Mar. 31, 1958, Ser. No. 725,039
4 Claims. (Cl. 230—259)

This invention relates to electric fans, and more particularly to chassis ventilating fans for electronic equipment. These fans are especially designed for cooling heat-generating components within enclosed electronic racks and cabinets, and for ventilation of the entire enclosure in such racks and cabinets.

Space limitations in such equipment often require that ventilating fans have minimum over-all depth.

Accordingly, it is a principal object of the present invention to provide fans of the above type which embody a shallowness of depth far in excess of anything previously available to the industry.

It is another object of the present invention to provide fans of the above type wherein the fan blade is positioned with approximately one-half (delivery side) of the blade projecting through a cone-type orifice or frame member whereby in the presence of any obstruction to air delivery in the line of direct air flow, such positioning causes the air delivery to become largely radial. Thus, not only does air flow continue in the presence of such obstructions, but air is directed to the full width of the enclosure for thorough air circulation.

It is still another object of the present invention to provide a modified fan of the above type which is adapted for flush mounting on bottom or side wall only on electronic cabinets, being used only to suck air into the cabinet or enclosed rack.

It is still another object of the present invention to provide fans of the above type which include an accessory sleeve, which may be used on either side of the fan, along with a guard equally flexible in location, making it possible to install the fans to either "suck" or "blow." Thus, the invention includes an orifice flange located in the center of the over-all depth, making it possible under extremely crowded conditions to mount the fan with less than two inches of its depth within the cabinet, and an equal amount projecting from top, side or rear.

It is still another object of the present invention to provide fans of the above type which may be satisfactorily installed in a horizontal shelf or partition behind meters or control panels and wherein the fans will operate equally well with the shaft in the horizontal or vertical position.

Other objects of the invention are to provide fans of the above type bearing the above objects in mind which are of simple construction, having a minimum number of parts, are inexpensive to manufacture and efficient in operation.

For other objects and for a better understanding of the invention, reference may be had to the following detailed description taken in conjunction with the accompanying drawings, in which.

Figures 1, 2, 3:
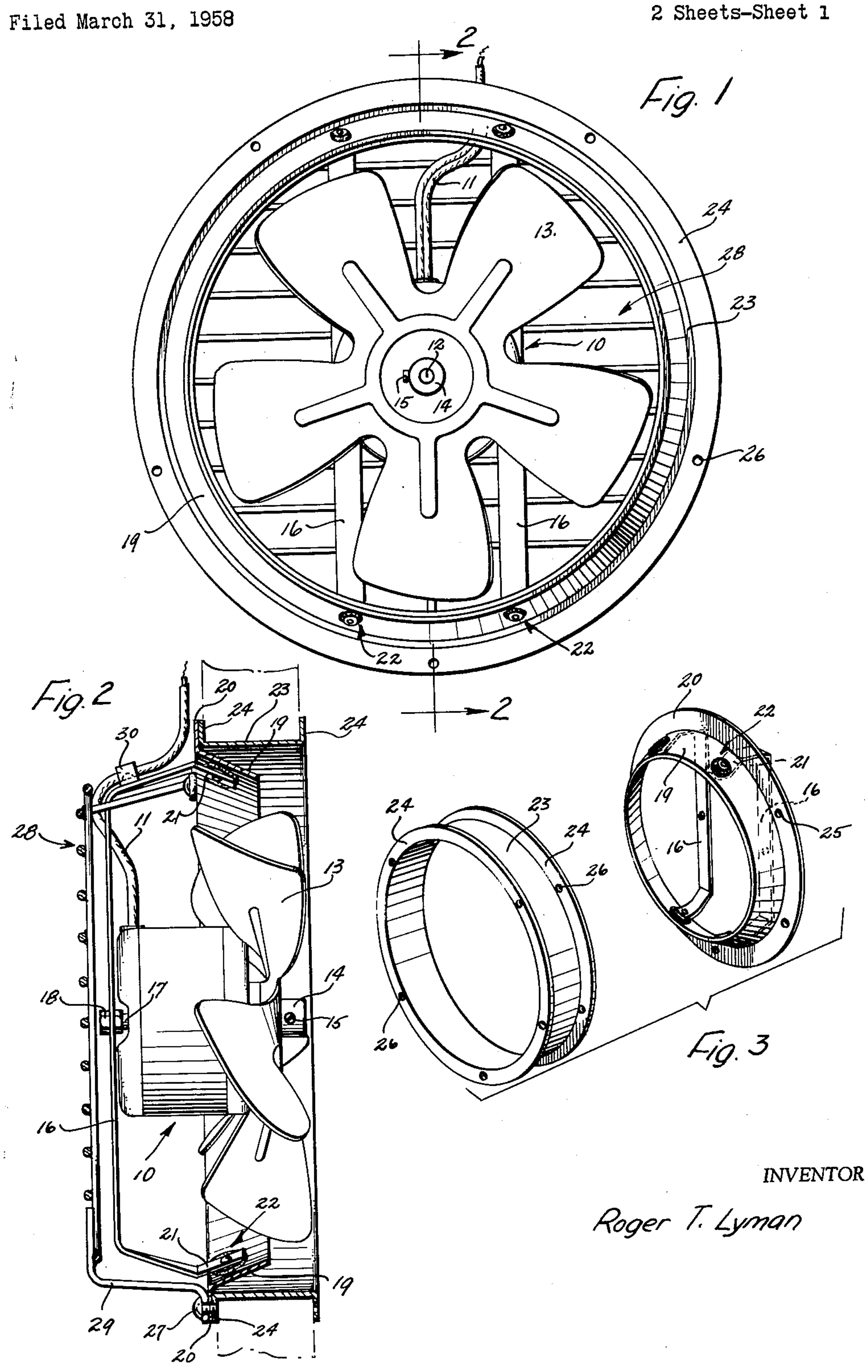
FIGURE 1 is a front elevational view of a preferred embodiment of the present invention.
FIGURE 2 is a vertical sectional view thereof taken along line 2—2 of FIGURE 1 and shown partly in elevation.
FIGURE 3 is an exploded perspective view of the conical fan orifice and mounting sleeve forming parts of the present invention.

Referring now to the drawings, and more particularly to FIGURES 1 through 4 thereof, a fan made in accordance with the present invention is shown to include the usual electric motor assembly indicated generally at 10, provided with electrical current through the usual insulated electrical cord 11, substantially as illustrated. The motor assembly 10 includes the usual shaft 12.

In the practice of my invention the fan blade 13, mounted in the usual manner on shaft 12, is bent or formed rearwardly over the motor assembly 10 (FIGURE 2) whereby to eliminate the projection of the individual wings of the blade beyond the face of the hub 14. The hub 14 is of a special short variety, substantially as illustrated, and is secured to the shaft 12 in the usual manner by means of the screw 15.

A pair of parallel, substantially U-shaped motor mounting straps 16 are provided and are secured at their central portions to the rear end of the motor assembly 10 by means of the bolts 17 and lock nuts 18.

In the further practice of my invention, a hollow frustro-conical fan orifice ring 19 is provided and includes a peripheral flange 20 (FIGURE 2). The free ends of the mounting straps 16 are bent inwardly, as at 21, and are secured to the interior of the fan orifice ring 19 by means of the shock mount indicated generally at 22. Each of these shock mounts includes a rubber grommet, a metal spacing collar, a metal rivet and a metal washer, in a manner well known to those skilled in the art. The function of the shock mounts is to eliminate the transmission of noise, vibration and motor hum to the electronic equipment, as will be obvious.

A hollow cylindrical mounting sleeve 23 is provided and includes the peripheral flanges 24 adapted to be juxtaposed with the peripheral flange 20 of the fan orifice ring 19. The peripheral flange 20 of the fan orifice ring 19 is provided with the mounting openings 25 adapted to be alined with the corresponding mounting openings 26 provided on each of the peripheral flanges 24 of the mounting sleeve 23 (FIGURE 3), the fan orifice ring being secured to the mounting sleeve by means of the screws 27 (FIGURE 2).

A fan guard of conventional design and indicated generally at 28, is provided and is secured to the peripheral flange 20 by means of the flange carrying members 29 by the same screws 27, as will be obvious. The mounting straps 16 fixedly mount in suitable manner the plastic cable clamp 30 to secure the electrical cord 11 in the manner shown. It will be noted that the peripheral flange 20 of the fan orifice ring 19 is positioned in the center of the total depth of the unit, so that in cases of extreme space limitation the unit may be mounted half in, half out of the enclosure. The mounting sleeve 23 and the fan guard 28, each applicable to either side of the flange 20, are provided as accessory parts to allow flush mounting of the unit to either suck air into or blow air from the enclosure, as will be obvious.

Figures 4, 5, 6:
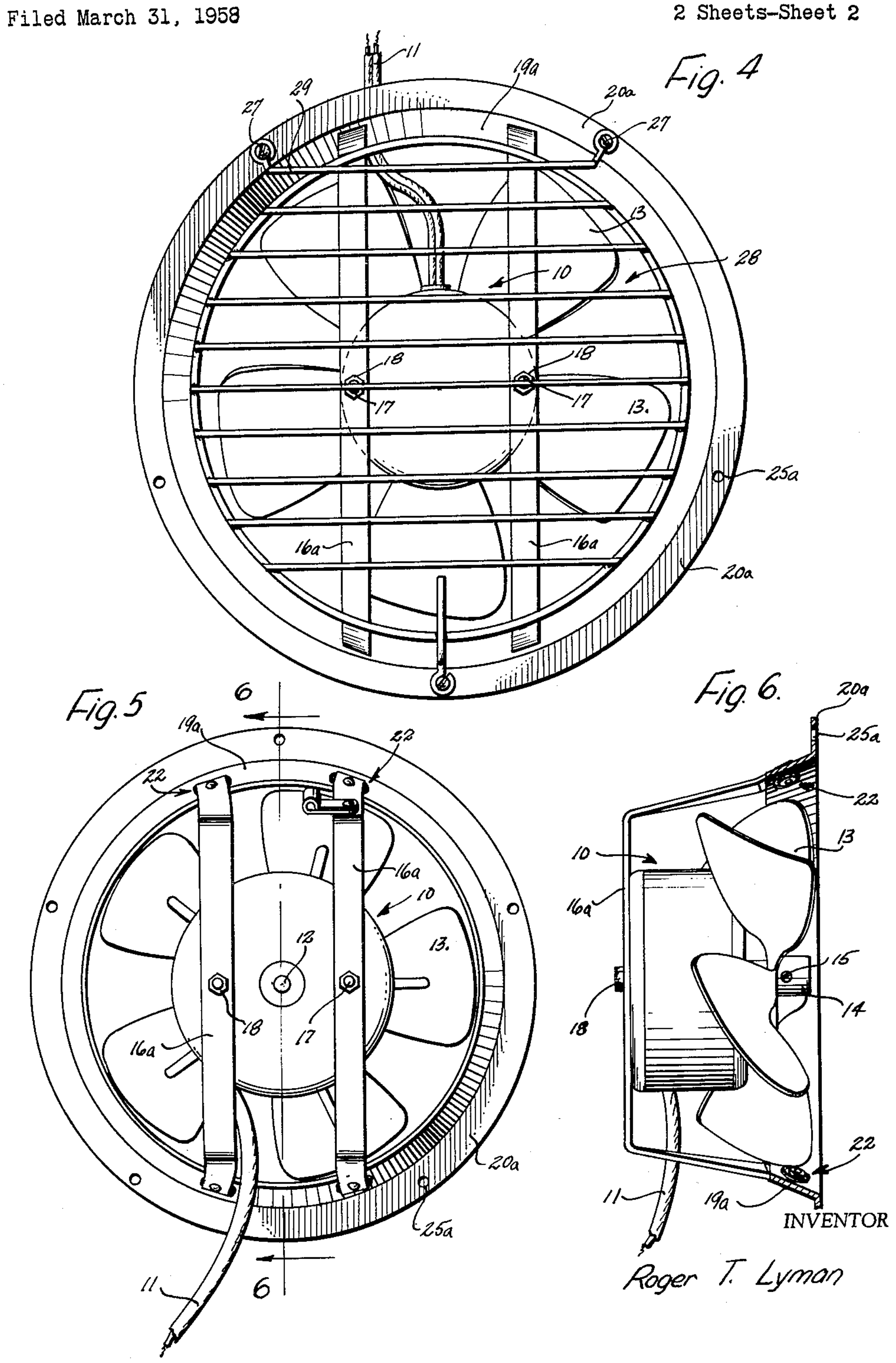
FIGURE 4 is a rear elevational view of the form shown in FIGURE 1.
FIGURE 5 is a rear elevational view of a modified form of the present invention.
FIGURE 6 is a vertical sectional view taken along the line 6—6 of FIGURE 5.

Referring now particularly to FIGURES 4 through 6, there is shown a modified form of the present invention, representing an adaptation of the principles and components described above to provide a unit for flush mounting on the bottom or side wall only of electronic cabinets, this model being used only to suck air into the cabinet or enclosed rack. In this form of the invention, the substantially trapezoidal shaped mounting straps **16*a* are secured to the hollow frustro-conical fan orifice ring 19*a* by means of the shock mounts 22, the central portions thereof being secured to the motor assembly 10 by means of the bolts 17 and lock nuts 18 as in the previous form. Here again the peripheral flange 20*a* of the fan orifice ring 19*a*** is provided with the mounting openings 25a. The shock mount openings in the fan orifice ring 19a are so positioned that the same orifice ring is common to both suck and blow model fans. Longer brackets, different assembly, and a blade of opposite rotation and hub location are required.

In other respects, the form of the invention shown in FIGURES 5 through 6 is the same as that shown in FIGURES 1 through 4 and like reference numerals identify like parts throughout the several views.

It should be apparent that there has been provided a fan of unique versatility, particularly as regards the assembly of the sleeve, fan and guard. For example, the sleeve of FIGURE 2 may be mounted on the motor side of the fan and the guard 28 on the fan side. It will also be apparent that the fan may be used without any accessory, installed half in, half out of the cabinet, under extreme space limitations.

While various changes may be made in the detail construction, it shall be understood that such changes shall be within the spirit and scope of the present invention as defined by the appended claims.

What I claim as new and desire to protect by Letters Patent of the United States is:

1. A shallow depth fan comprising the combination of an electric motor having a housing with a rotary shaft extending from said housing and a fan blade having a central hub having a plurality of fan wings extending therefrom; said rotary shaft of said electric motor extending from a surface of said electric motor housing; said central hub of said fan blade being secured to said rotary shaft; each of said plurality of fan wings extending generally radially of said hub and bending rearwardly toward said electric motor housing; said plurality of fan wings having air moving surfaces bent at an angle to the plane defined by the rotation of said fan wings; said air moving surfaces at least partially within an area concentric with said electric motor housing; the entire portion of said fan blade falling within a volume bounded by the end of said hub away from said surface of said motor housing surface; said rearward bend of said plurality of fan wings causing a radial component of air motion of air moved by said fan wings; an orifice ring having a conical shape; said orifice ring being coaxially mounted with respect to said electric motor housing; the smallest diameter of said conically shaped orifice ring lying in a plane substantially centrally located along the axis of the circular area swept by the ends of said fan wings; the largest diameter of said orifice ring having a mounting flange extending therefrom for mounting said fan from a mounting surface in a half-in, half-out position.

2. A shallow depth fan comprising the combination of an electric motor having a housing with a rotary shaft extending from said housing and a fan blade having a central hub having a plurality of fan wings extending therefrom; said rotary shaft of said electric motor extending from a surface of said electric motor housing; said central hub of said fan blade being secured to said rotary shaft; said plurality of fan wings having air moving surfaces bent at an angle to the plane defined by the rotation of said fan wings; said air moving surfaces at least partially within an area concentric with said electric motor housing; the entire portion of said fan blade falling within a volume bounded by the end of said hub away from said surface of said motor housing surface; a circular mounting ring; said circular mounting ring having an axial length substantially equal to one-half the distance from said end of said hub to the end of said motor housing opposite said motor housing surface; said circular mounting ring having a first and second mounting flange at either end thereof; said circular mounting ring being co-axially connected to said electric motor housing with said first flange substantially in a plane receiving said end of said mounting hub; a mounting surface; said first flange being operable to mount said shallow depth fan flush with respect to a mounting surface; said second flange being operable to mount said shallow depth fan in a half-in, half-out relation with respect to said mounting surface.

3. A shallow depth fan comprising the combination of an electric motor having a housing with a rotary shaft extending from said housing and a fan blade having a central hub having a plurality of fan wings extending therefrom; said rotary shaft of said electric motor extending from a surface of said electric motor housing; said central hub of said fan blade being secured to said rotary shaft; each of said plurality of fan wings extending generally radially of said hub and bending rearwardly toward said electric motor housing; said plurality of fan wings having air moving surfaces bent at an angle to the plane defined by the rotation of said fan wings; said air moving surfaces at least partially within an area concentric with said electric motor housing; the entire portion of said fan blade falling within a volume bounded by the end of said hub away from said surface of said motor housing surface; said rearward bend of said plurality of fan wings causing a radial component of air motion of air moved by said fan wings; an orifice ring having a conical shape; said orifice ring being co-axially mounted with respect to said electric motor housing; the smallest diameter of said conically shaped orifice ring lying in a plane substantially centrally located along the axis of the circular area swept by the ends of said fan wings; a circular mounting ring; said circular mounting ring having an axial length substantially equal to one-half the distance from said end of said hub to the end of said motor housing opposite said motor housing surface; said circular mounting ring having a first and second mounting flange at either end thereof; said circular mounting ring being co-axially connected to said electric motor housing with said first flange substantially in a plane receiving said end of said mounting hub; a mounting surface; said first flange being operable to mount said shallow depth fan flush with respect to a mounting surface; said second flange being operable to mount said shallow depth fan in a half-in, half-out relation with respect to said mounting surface.

4. A shallow depth fan comprising the combination of an electric motor having a housing with a rotary shaft extending from said housing and a fan blade having a central hub having a plurality of fan wings extending therefrom; said rotary shaft of said electric motor extending from a surface of said electric motor housing; said central hub of said fan blade being secured to said rotary shaft; each of said plurality of fan wings extending generally radially of said hub and bending rearwardly toward said electric motor housing; said plurality of fan wings having air moving surfaces bent at an angle to the plane defined by the rotation of said fan wings; said air moving surfaces at least partially within an area concentric with said electric motor housing; the entire portion of said fan blade falling within a volume bounded by the end of said hub away from said surface of said motor housing surface; said rearward bend of said plurality of fan wings causing a radial component of air motion of air moved by said fan wings; an orifice ring having a conical shape; said orifice ring being co-axially mounted with respect to said electric motor housing; the smallest diameter of said conically shaped orifice ring lying in a plane substantially centrally located along the axis of the circular area swept by the ends of said fan wings; the largest diameter of said orifice ring having a mounting flange extending therefrom for mounting said fan from a mounting surface in a half-in, half-out position; and a circular mounting ring having a first and second flange; said first flange of said circular mounting ring being removably connected to said mounting flange.

(References on following page)

References Cited in the file of this patent

UNITED STATES PATENTS

| | | |
|---|---|---|
| 1,614,190 | Dyer | Jan. 11, 1927 |
| 1,715,669 | Nuttall | June 4, 1929 |
| 1,781,155 | Anderson | Nov. 11, 1930 |
| 1,792,514 | Spear | Feb. 17, 1931 |
| 1,873,343 | Seyfried | Aug. 23, 1932 |
| 1,886,683 | Hueglin | Nov. 8, 1932 |
| 1,886,841 | Searles | Nov. 8, 1932 |
| 2,093,057 | Redmond | Sept. 14, 1937 |
| 2,130,910 | Smith | Sept. 20, 1938 |
| 2,260,233 | Ripley | Oct. 21, 1941 |
| 2,295,451 | Davis et al. | Sept. 8, 1942 |
| 2,328,072 | Hans | Aug. 31, 1943 |
| 2,378,049 | Upson | June 12, 1945 |
| 2,553,172 | Carrick | May 15, 1951 |
| 2,633,718 | Wile | Apr. 7, 1953 |
| 2,638,835 | Strawsine | May 19, 1953 |
| 2,728,541 | Hansel | Dec. 27, 1955 |
| 2,752,843 | Strawsine | July 3, 1956 |
| 2,755,015 | Douglas et al. | July 17, 1956 |
| 2,776,089 | Burrowes et al. | Jan. 1, 1957 |
| 2,900,128 | Piper et al. | Aug. 18, 1959 |
| 2,912,159 | Ganger et al. | Nov. 10, 1959 |

FOREIGN PATENTS

| | | |
|---|---|---|
| 610,839 | Great Britain | Oct. 21, 1948 |